United States Patent [19]

Hiles

[11] Patent Number: 5,754,799
[45] Date of Patent: May 19, 1998

[54] SYSTEM AND METHOD FOR BUS CONTENTION RESOLUTION

[75] Inventor: Paul Edward Hiles, Houston, Tex.

[73] Assignee: Paradyne Corporation, Largo, Fla.

[21] Appl. No.: 607,912

[22] Filed: Feb. 28, 1996

[51] Int. Cl.⁶ .......................... G06F 13/14; H04L 12/403
[52] U.S. Cl. .................. 395/290; 395/287; 370/447
[58] Field of Search ............................ 395/280, 287, 395/290, 200.05, 293, 729; 340/825.03, 825.5; 370/432, 438, 439, 447, 431, 449, 437

[56] References Cited

U.S. PATENT DOCUMENTS

| | | | |
|---|---|---|---|
| 4,434,421 | 2/1984 | Baker et al. | 340/825.51 |
| 4,608,700 | 8/1986 | Kirtley, Jr. et al. | 370/439 |
| 4,774,707 | 9/1988 | Raychaudhuri | 370/447 |
| 4,785,396 | 11/1988 | Murphy et al. | 395/286 |
| 5,383,185 | 1/1995 | Armbruster et al. | 370/447 |
| 5,392,285 | 2/1995 | Kurts | 370/407 |
| 5,398,243 | 3/1995 | Aguilhon et al. | 370/438 |
| 5,453,737 | 9/1995 | Opoczynski | 340/825.03 |
| 5,651,009 | 7/1997 | Perreault et al. | 370/447 |

*Primary Examiner*—Gopal C. Ray
*Attorney, Agent, or Firm*—Thomas, Kayden, Horstemeyer & Risley

[57] ABSTRACT

A bus resolution system and method for resolving bus contention is used on a serial bus shared by multiple devices that broadcast data over the serial bus between the devices, giving rise to the possibility of data collisions. Of the devices sharing the serial bus, one device is designated as the master device with the remaining devices being designated as slave devices. The master device is responsible for controlling allocation of the serial bus between each of the slave devices so that only one slave device controls the bus at a time. Further, the master device is responsible for resolving bus collisions when multiple slave devices attempt to transmit at the same time and their data overlaps in time. Upon detecting a bus collision, the master device quickly and deterministically resolves the collision by identifying one of the colliding slave devices so that its data can be transmitted successfully. This is achieved by a data resolution manager that selectively requests specific subsets of the slave devices to retry their data transmissions until a subset is selected that contains only one of the slave devices that was a part of the original collision. Upon identifying such a subset of the slave devices, the colliding slave device in that subset is granted control over the serial bus so that it can transmit its data.

26 Claims, 12 Drawing Sheets

SYSTEM AND METHOD FOR BUS CONTENTION RESOLUTION

The present application is related to a patent application Ser. No. 08/608,378 entitled "Slot Token Protocol," filed on Feb. 28, 1996, concurrently herewith by the same inventor and assigned to the same assignee as the present application.

FIELD OF THE INVENTION

This invention generally relates to computer systems that broadcast data over a serial bus that is shared between several devices, and more particularly, to a system and method for resolving data collisions occurring on a serial bus shared by several devices when the identity and number of colliding devices is unknown.

BACKGROUND OF THE INVENTION

The desire to provide greater and greater bandwidth over a single transmission line has spurred on the development of numerous new and improved transmission techniques with advanced communication hardware and software. In an effort to respond to the needs of growing businesses that are integrating offices that are geographically separated, in addition to the growing popularity of the internet, increased bandwidth and broadcast quality have dramatically improved in recent years. For example, a 14.4 Kbps modem which provides amplitude modulation (AM) radio quality sound and small jerky video is far from optimum when compared with the current transmission techniques being developed and implemented such as integrated services digital network (ISDN), asynchronous transfer mode (ATM), and asymmetric digital subscriber line (ADSL), all of which are capable of providing compact disc (CD) quality sound and broadcast quality video or better.

However, such technology is useless unless other additional technology is available to support it. For instance, a business may have numerous high speed data transmission lines terminating at their office site in order to service their communication needs. However, in order to terminate the high speed transmission lines, the business must have an interface device capable of connecting the transmission lines to the terminal equipment at their office site, such as a computer terminal, a computer system or network, or a PBX.

An example of an interface device known to be used for terminating high speed transmission lines such as a T1 trunk line is a channel service unit\data service unit (CSU\DSU) device 2, as illustrated in FIG. 1. In general, a CSU\DSU device can be described as a piece of hardware with imbedded firmware for interfacing T1 trunk line with data terminal equipment (DTE) located at a business site. A CSU\DSU device performs both CSU functions, such as interfacing the digital circuit of the T1 trunk line, and DSU functions, such as interfacing and subdividing the bandwidth of the T1 trunk line for connection to separate DTE. Because a typical business requires more than one T1 line, a carrier comprising up to sixteen T1 trunk lines is typically provided to a business site and terminated at a nest 3 of CSU\DSU devices. A nest comprises up to sixteen CSU\DSU devices (one for each T1 trunk line) integrated into a single housing in a side-by-side configuration. Further, a nest includes an user interface panel 4 for supporting management and integration of the CSU\DSU devices. Specifically, the user interface panel allows the user to perform various management functions on any one of the CSU\DSU devices of the nest, usually one at a time.

To further support management and communication between the respective CSU\DSU devices and the external devices connected to the nest, one or more management channels 5 are implemented in the backplane assembly of the nest. These management channels are comprised of asynchronous serial buses that are connected to and shared between all the CSU\DSU devices of the nest. Across these management channels flow data from various source/destination devices such as a personal computer (PC) 7, a printer 8, or a network manager station 9. As shown in FIG. 1, the PC 7 and printer 8 are connected to one management channel and the network manager station 9 is connected to the other management channel. The PC 7 may download an upgrade program used to re-program one of the CSU\DSU devices or may perform front panel emulation to allow the user to control one of the CSU\DSU devices from a remote location, (i.e., the functional equivalent of standing at the user interface panel). The printer B may provide alarm reporting of problem with a T1 trunk line terminating at the nest or with one of the CSU\DSU devices. The network manager station 9 may provide network control. Note that it is desirable for a single management channel to be able to support multiple source/destination devices so that multiple operations can take place at the same time on one management channel.

Because the management channels 5 are shared by up to sixteen different CSU\DSU devices, a need exists for a multi-protocol designed for coordinating the transmissions of data over the shared serial buses of the management channel with the capability of detecting and resolving a data collision when multiple CSU\DSU devices broadcast data over a single serial buses and that data overlaps in time.

Numerous techniques have been proposed in the art for resolving data collisions on a shared bus, that is, on a broadcast-based communication bus. A brief discussion of several exemplary types of prior art collision resolution schemes is set forth hereafter, though it should be noted that this discussion is not exhausted.

In a local area network (LAN), Ethernet may be utilized as a transmission media for carrying broadcast transmissions generated by the computers attached to the Ethernet. The computers attached to the Ethernet essentially listen for silence on the bus of the Ethernet before transmitting their data packets. When a data collision occurs on the Ethernet, the computers that transmitted the data detect the collision via hardware present at each computer on the network, and then retry their transmissions some short random time later. The hardware performing collision detection is typically embodied on a network card associated with each of the computers. In situations of heavy traffic on the Ethernet, this random delay before retry can cause significant network overhead with most transmissions resulting in collisions. This is a non-deterministic approach to the problem of data collision which requires specific hardware and performs poorly under very heavy network traffic conditions.

In a wide area network (WAN), a multi-point protocol may be used that does not incorporate polling. In this configuration, the slave units only transmit when they believe the bus is clear, detecting collisions as they occurred. The collision detection and resolution scheme performed here is performed in much the same manner as with a LAN.

Lastly, with a leased-line modem, multi-point protocol such as advanced diagnostic protocol (ADP) is typically utilized. This is a polled environment on a low-speed connection. Lease-line modems use a multi-point polling protocol to provide a centralized network diagnostic capability where test and status commands are given from a central network control facility. Each modem in the network polls its subordinate modems for responses to diagnostic commands previously sent. While this approach is fine for low-bandwidth testing, it would be very inefficient for sustained data transfer applications. For example, if a modem has 8 subordinate modems that it is connected to, and immediately after it polls the first modem for status the first modem generates a change in status, that modem has to wait for seven other modems to be polled for their status before it will get another opportunity to send its updated status. However, because this is a polled environment, there is no possibility of a collision on the shared network.

Although the techniques of the prior art have some merit, they do not provide for collision detection and resolution in a deterministic manner and without the requirement of using hardware.

Thus, a heretofore unaddressed need exists in the industry for a system and method capable of detecting and resolving bus collisions in a deterministic manner on a serial bus shared by several devices with no supporting hardware.

SUMMARY OF THE INVENTION

The present invention overcomes the inadequacies and deficiencies of the prior art that are well known in the industry. The present invention provides for a collision resolution manager that can be employed as part of a data-link layer protocol operating on a serial bus shared by multiple devices. For purposes of the present invention, a device is any device that requires to communication over a serial bus that is shared among devices of the same/similar type (e.g., in a central office, groups of modems, CSU\DSU's, or ISDN terminal adapters). The collision resolution manager provides for fast, fair, and deterministic resolution of data collisions on the serial bus when the identity and number of colliding devices is unknown. The collision resolution manager requires no hardware and does not have the overhead of polling as found in the prior art. In accordance with a feature of the present invention, the collision resolution manager includes a Collision Resolution matrix for providing resolution logic in resolving a data collision. The resolution logic provided by the Collision Resolution Matrix is engineered so as to prevent random delay in collision resolution. As a result, there is a calculable worst-case time to resolve any data collision. This is especially important when the serial bus is of low bandwidth, operating at or below 38.4 Kbps.

In architecture, the collision resolution manager of the present invention is configured in the memory associated with each of a plurality of devices sharing a serial bus. In the preferred embodiment, the devices are CSU\DSU devices sharing a management channel in a CSU\DSU nest. In the nest, one CSU\DSU device is designated as the master, and the remaining devices are designated as slaves. The management channel shared by the master device and the slave devices comprises two one-way serial buses. One of the serial buses is configured for transferring data from anyone of the slave devices to the master device and this, is referred to as the slave transmit bus. The master transmit bus is not subject to data collisions because the master device is the only device transferring data over it. The other serial bus is configured for transferring data from the master device to all of the slave devices, and thus, is referred to as the master transmit bus. The slave transmit bus is subject to data collisions because multiple slave devices attempt to transmit data over it concurrently and the data overlaps.

The master device is responsible for coordinating the sharing of the slave transmit bus by the slave devices. This is achieved by requiring the slave devices to submit a bus request over to the master device via the slave transmit bus. The master device then allocates control of the slave transmit bus to the requesting slave device or, if the bus request of multiple slave devices collide on the slave transmit bus, the master device resolves the bus contention. Therefore, the only possibility for a bus collision is on the slave transmit bus between two bus requests.

Worth noting at this point is that the master and slave devices are essentially identical with the exception that the master device includes a collision detection mechanism for detecting collisions on the slave transmit bus. When the master device detects a collision on the slave transmit bus, it communicates with the slave devices via the master transmit bus to resolve the bus contention in an expedited manner. In resolving the bus collision, the collision resolution manager of the master device interacts with the collision resolution manager of each of the slave devices.

The present invention can also be thought of as a software program comprising executable (i.e., computer-readable) instructions encoded on a memory medium associated with each CSU\DSU device of the nest so as to cause the CSU\DSU devices to function in the following manner. Initially, the master device detects a data collision on the slave transmit bus resulting from multiple devices transmitting data (bus request) at the same time. Upon detecting the bus collision, the master device requests that a subset of all the slave devices retry their transmissions. The slave devices that are in the specified subset, and were a part of the collision, retry their transmissions. Those slave devices that are not in the specified subset cannot retry their transmissions until the data collision has been resolved and the bus has been returned to an Available state (i.e., a steady state condition). If the master device detects another collision upon the retry transmission by the slave devices within the specified subset, the master device selects a second subset of all slave devices and request that the second subset of devices that were a part of the original collision retry their transmissions. This slave subset reduction is continually performed until a subset is selected that includes only one slave device completes a successful transmission of its bus request. If, upon the request by the master device for a particular subset to retry their transmissions, no transmissions are detected by the master device within a specified time, the master device acts as if a collision had occurred on the retry and, as described above, selects another subsequent subset for retry.

The subsets selected by the master device during collision resolution are defined by the Collision Resolution Matrix known by the master device and all the slave devices. In the preferred embodiment, the subsets are identified by row numbers which indicate the particular devices that are a part of that subset. Each subset includes approximately one-half of the slave devices each subset including a different grouping of slave devices. Thus, the number of subsets necessary in the Collision Resolution Matrix is approximately $\log_2$ (number of devices sharing the bus).

An advantage of the collision resolution manager system and method of the present invention is that they provide deterministic results in that there is a finite number of subsets which need be tried for a given number of slave devices before a collision is resolved and a single slave completes its successful transmission.

Another advantage of the collision resolution manager system and method of the present invention is that they provide flexibility and expandability in the configuration of the nest by being configured in software and not being hardware dependent. Specifically, the present invention can be modified and/or expanded upon by merely updating the Collision Resolution Matrix and the executable instructions comprised in the collision resolution manager.

Another advantage of the collision resolution manager system and method of the present invention is that they provide fair resolution of the data collisions on a serial bus so that one slave device cannot exhibit dominance over other slave devices in multiple collision resolutions.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The present invention can be better understood with reference to the following drawings. The elements of the drawings are not necessarily to scale, emphasis instead being placed upon clearly illustrating the principles of the present invention. Further, like referenced numerals designate corresponding parts throughout the several views.

DETAILED DESCRIPTION OF THE PREFERRED EMBODIMENT

Figure 1:
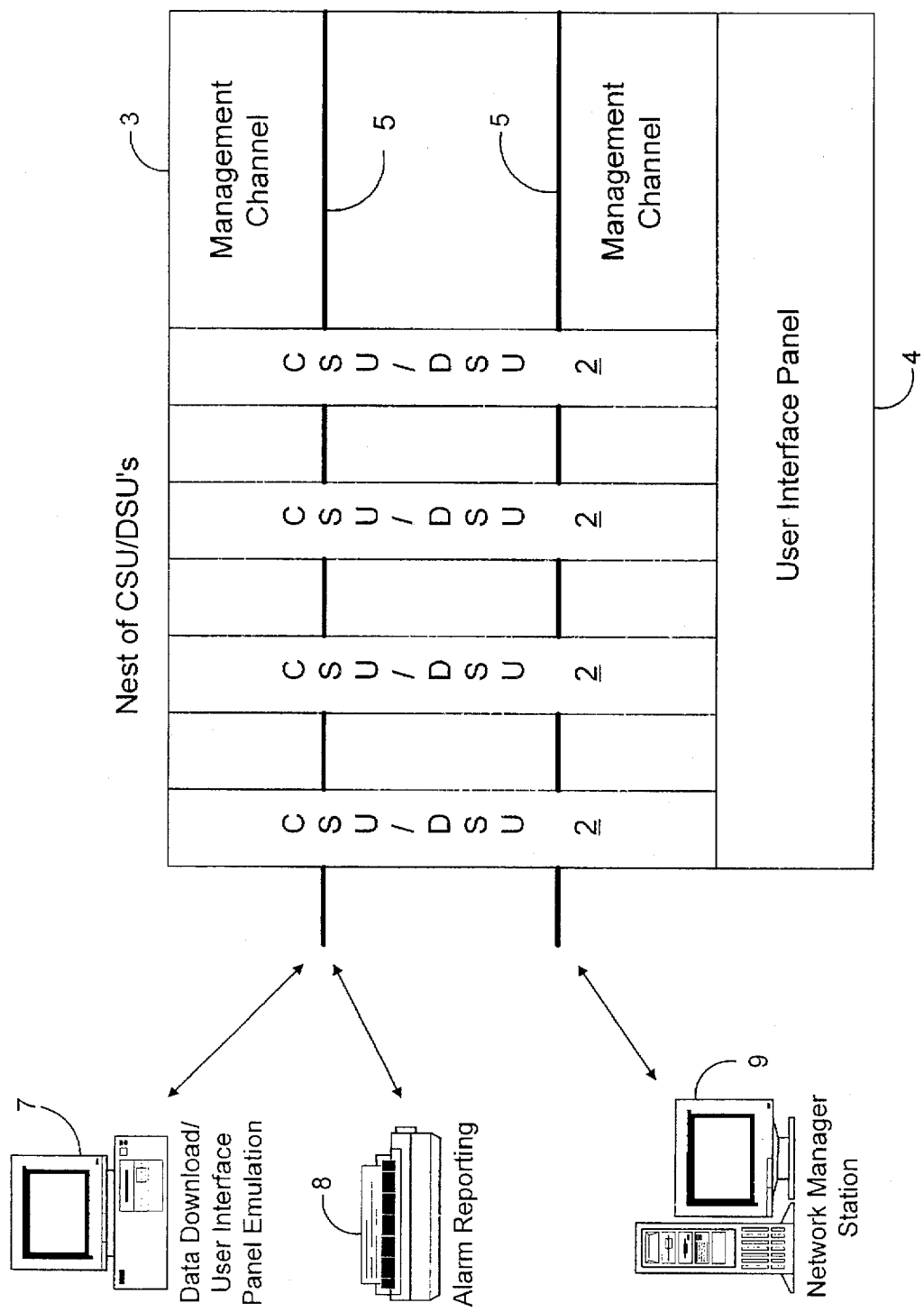
FIG. 1 is a schematic block diagram of a nest of CSU\DSU's, as found in the prior art, including two management channels interconnecting the CSU\DSU devices of the nest.

The following description is of the best presently contemplated mode of carrying out the present invention in the context of a nest of CSU\DSU devices having at least one serial bus shared by more than one of the CSU\DSU devices for broadcasting data in the form of datagrams, as described in the Background section and illustrated in FIG. 1. However, as can be appreciated by one of ordinary skill in the art, the present invention is equally applicable in other computer systems that broadcast datagrams over a serial bus that is shared between multiple devices, thereby giving rise to the possibility of data collisions, such as central (interconnected) leased-line modems or ISDN devices. Thus, the present description is not to be taken in a limiting sense but is made merely for the purpose of describing the general principles of the present invention. The scope of the invention should be determined by referencing the appended claims.

Figure 2:
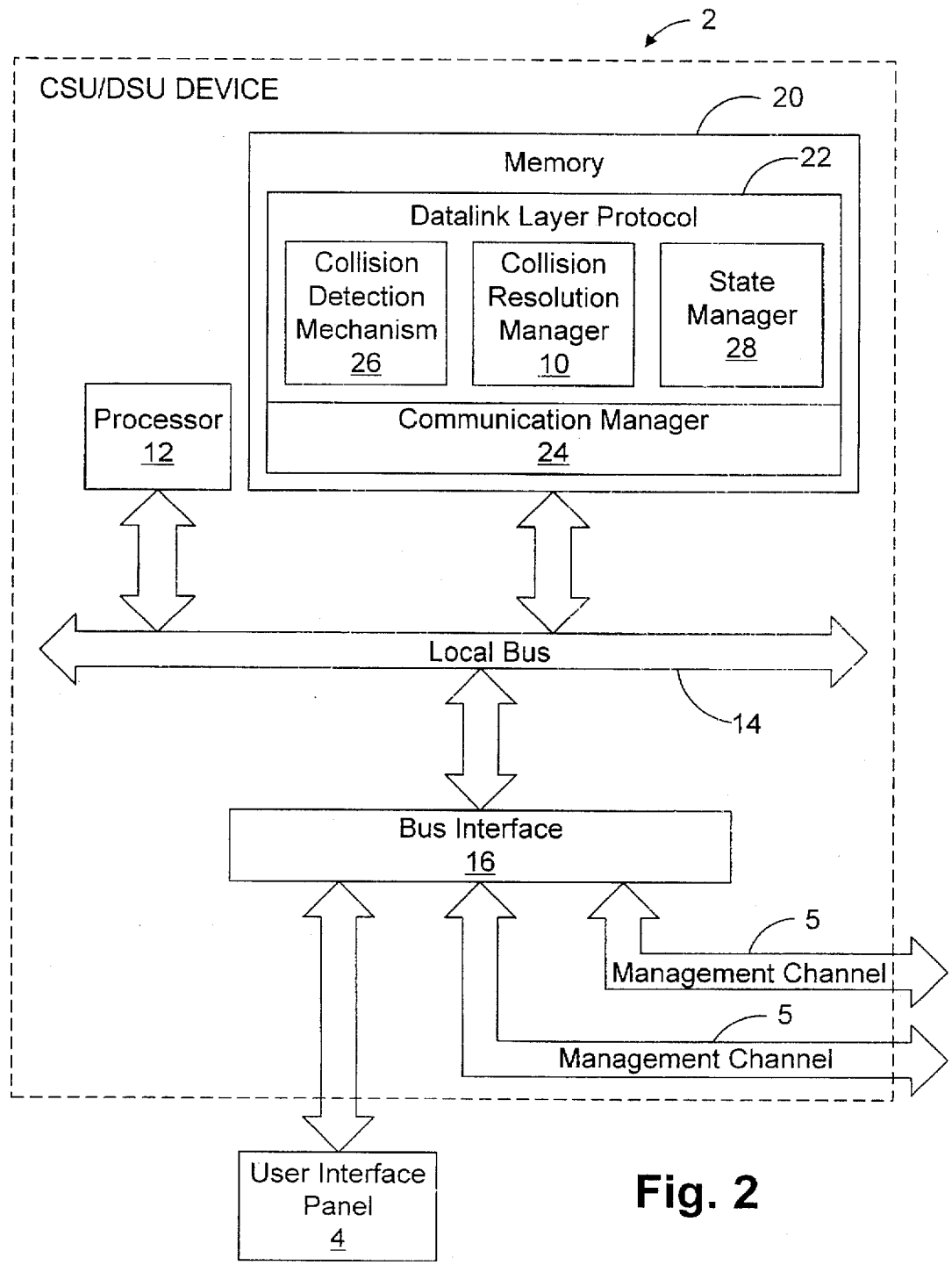
FIG. 2 is a block diagram of a collision resolution manager in accordance with the present invention in the context of a CSU\DSU device.

As illustrated in FIG. 2, the bus contention resolution system of the present invention is implemented by the collision resolution manager 10 within a CSU\DSU device 2. The collision resolution manager 10 can be stored on any computer-readable medium for use in connection with any computer-readable system or method. In context with this document, a computer-readable medium is any electronic, magnetic, optical or other physical device or means that can contain or store a computer program for use by or in connection with a computer-related system or method. The CSU\DSU device 2 includes a processor 12 that communicates with other elements within the CSU\DSU device 2 via a local bus 14. A bus interface 16 is provided to interface the CSU\DSU device 2 with a user interface panel 4 and one or more management channels 5. A memory 20 within the CSU\DSU device 2 contains the collision resolution manager 10. Preferably, the collision resolution manager 10 is implemented as a part of a data-link layer protocol 22 that is managed by a communication manager 24. It is noted that data-link layer protocol 22 is merely one of several layers comprising a protocol stack under the Open System Interconnect (OSI) standard. The additional layers comprising the protocol stack typically includes a lower physical layer and several upper layers including a network layer, a transport layer, a session layer, a presentation layer, and an application layer. For simplicity, aforementioned layers are not illustrated in FIG. 2 though it would be apparent to one of skill in the art implementing a protocol stack that such layers exist and are required for the operation of the CSU\DSU device 2.

A collision detection mechanism 26 is also provided as a part of data-link layer protocol 22. The collision detection mechanism 26 enables the processor 12 to detect data collisions on the management channels 5 which are shared by multiple CSU\DSU devices a discussed in the Background section. This is achieved using serial communication channel (SCC) framing error indication and software validation, as will be described in greater detail below. Further, a state manager 28 is also provided as a part of data-link layer protocol 22 for defining the finite state machines which control the operation of datalink layer protocol 22.

Figure 3:
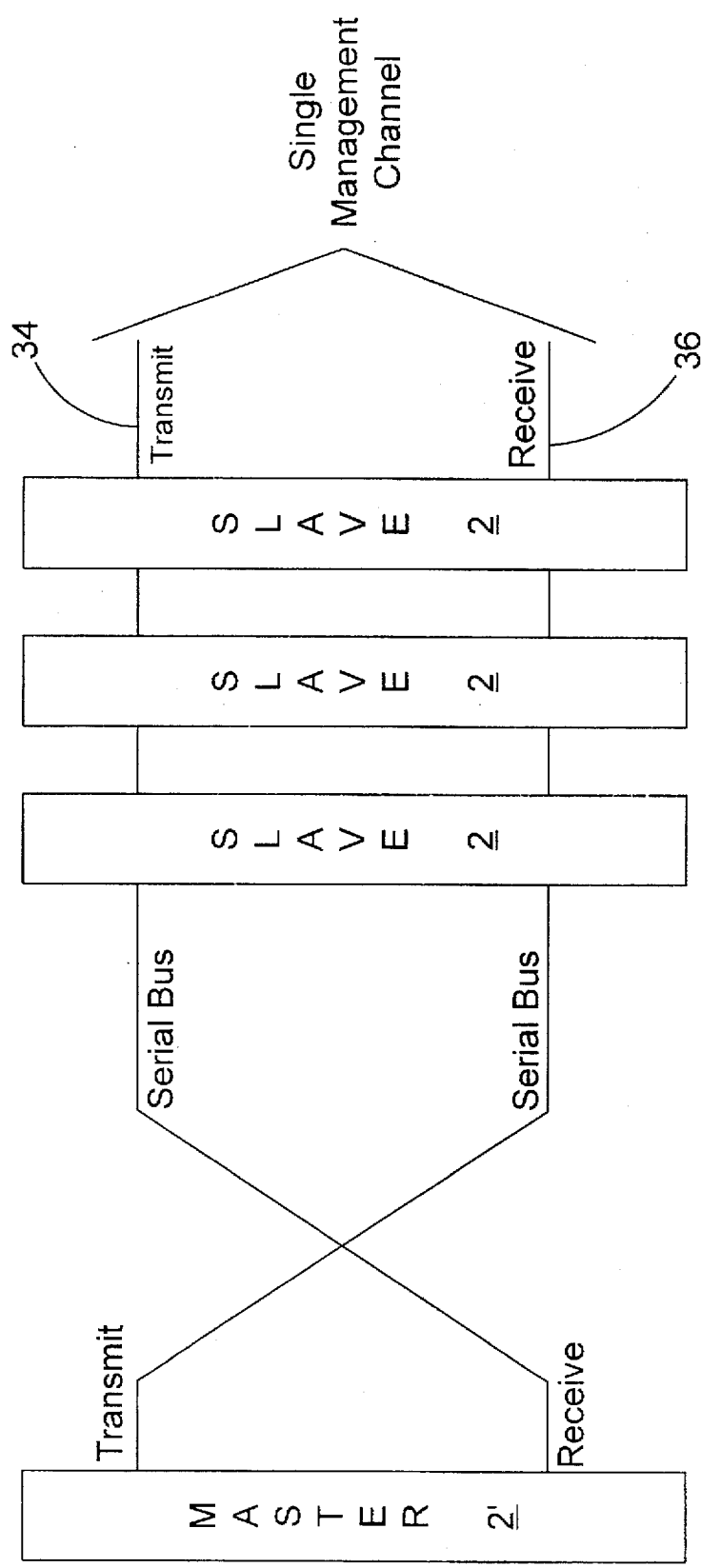
FIG. 3 is a block diagram illustrating the connection between the master and slave devices of the present invention by the two serial buses comprising a management channel.

A requirement of the present invention is that one, and only one, of the CSU\DSU devices be designated, per management channel 5, as a master device 2' and the remaining devices be designated as slaves 2, as shown in FIG. 3. Although the same device can be configured as the master device 2' for more than one management channel, this is not desirable due to the processing and overhead incurred.

For purposes of clarity, it is noted at this point that the data-link layer protocol 22 only exists within the nest 3 (FIG. 1) and does not travel outside the nest to the connected external devices, such as PC 7, printer 8, or network manager station 9. Additionally, the external devices connected to the nest 3 do so through the master device 2'. Thus, the master device 2' is responsible for receiving data that is destined for the slave devices 2 and then sending data to the correct slave device 2. In addition, the master device 2' is also responsible for relaying transmissions from any slave device 2 to the appropriate external device.

With reference to FIG. 3, the inter-connection architecture of the master device 2' and the slave devices 2 for a single management channel 5 is illustrated. Note that the management channel 5 comprises two one-way serial buses including a slave transmit bus 34 shared by the slave devices for transmitting data and a master transmit bus 36 for the master device to transmit data. It is important to note that in the context of the present invention all the transmissions are broadcast on the respective buses 34, 36. Further, the two buses 34, 36 are crossed so that when the master device 2' transmits data, that data is received by all the slave devices 2, and when any one of the slave devices 2 transmits data, that data is received by the master device 2'. In this configuration, the master device 2' is the only device that receives the transmissions of the multiple slave devices 2 sharing slave transmit bus 34. An advantage of this is that the only bus with the possibility of a data collision is the slave transmit bus 34 since multiple devices share this bus for transmitting data. Thus, the master device 2' can detect the data collision on the slave transmit bus via the collision detection mechanism 26 an then the master transmit bus 36 interacts with the slaves devices 2 in order to resolve the collision in the manner described hereinafter. Accordingly, one of skill in the art will recognize that the collision detection mechanism 26 need only be implemented in the master device 2'.

Figure 4:
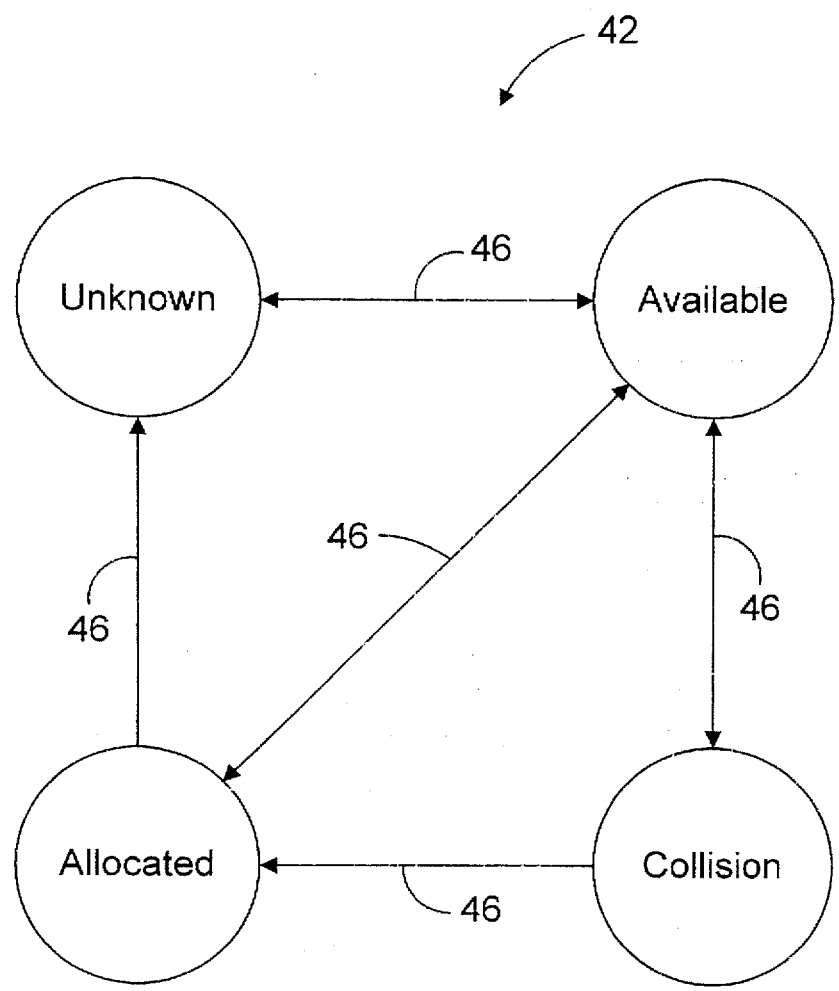
FIG. 4 is a receive state transition diagram of the master device of FIG. 3.
Figure 5:
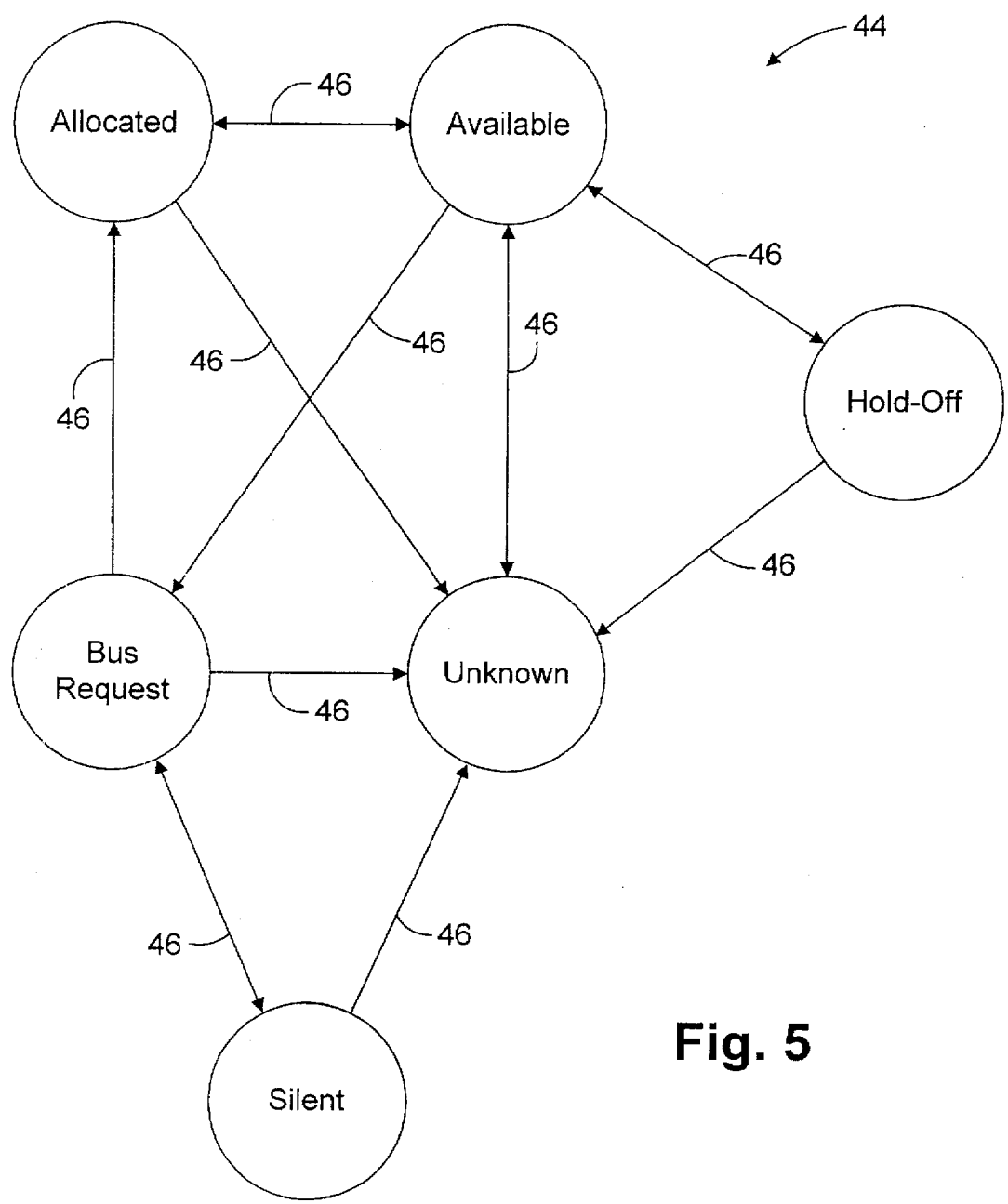
FIG. 5 is a transmit state transition diagram of a slave device of FIG. 3.

In accordance with a functionality of the master device 2', the master device 2' acts as a bus arbitrator for allocating control over the slave transmit bus 34 to one slave device 2 at a time because the slave devices have no way of knowing when their transmissions collide with the transmissions of other slave devices. This particular functionality of the master device 2' is imparted by the state managers 28 (FIG. 2) of the master device 2' and the slave devices 2. The state manager 28 of each device is responsible for implementing various finite state machines that define the data-link connections illustrated in FIG. 3 between the master device 2' and anyone of the slave devices 2. In essence, the state manager 28 of the present invention is part of a multi-port protocol in that the link between a single slave device 2 and the master device 2', i.e., slave transmit bus 34, is continuously being established and broken as different slave devices contend for bus ownership for transmitting datagrams. This is achieved by the reasoning provided by a Master Received State Machine 42 that is implemented at the master device 2' and as illustrated in FIG. 4, and a Slave Transmit State Machine 44 that is implemented at each of the slave devices 2 and as illustrated in FIG. 5. The Master Receive and Slave Transmit State Machines 42, 44 are implement via the state manager 28 of the master device 2' and each slave device 2, respectively, and interoperate to control access to the slave transmit bus 34 in the following manner.

As an initial matter, it is noted that the Master Receive and Slave Transmit State Machine 42, 44 allow the master device 2' and the slave devices 2 to agree on the state of the slave transmit bus 34 during operation. This insures that all the devices are synchronized with one another. With general reference to FIGS. 4 and 5, the four major bus states are Available, Collision, Allocated, and Unknown. The Available state indicates that no slave device 2 owns the bus and that any slave device 2 may request the bus. The Collision state indicates that multiple slaves device 2 bus requests have collided on the bus and that the master device 2' is attempting to resolve the collision. The equivalent states in the slave devices 2, as provided in FIG. 5, are Silent and Hold-Off. The Allocated state indicates that the master device 2' has allocated the bus to a single slave device 2. In this state, all of the slave devices 2 must remain off the bus until the bus state returns to the Available state. Lastly, the Unknown state is entered on device power-up and when the state manager 23 needs to re-initialize (e.g., due to an internal error during operation). The connections 46 between the states in FIGS. 4 and 5 represent the transitional strategy of the state manager 28 based upon the occurrence of specific events. The preferred operation and sequence events corresponding with the operation of the Master Receive State Machine 42 and the Slave Transmit State Machine 44 of the present invention and the associated methodology are described hereafter with reference to the flowcharts of FIGS. 6–8. Note that the flowchart of an embodiment of a particular module is shown as a Figure number within the box of that module.

Figure 6:
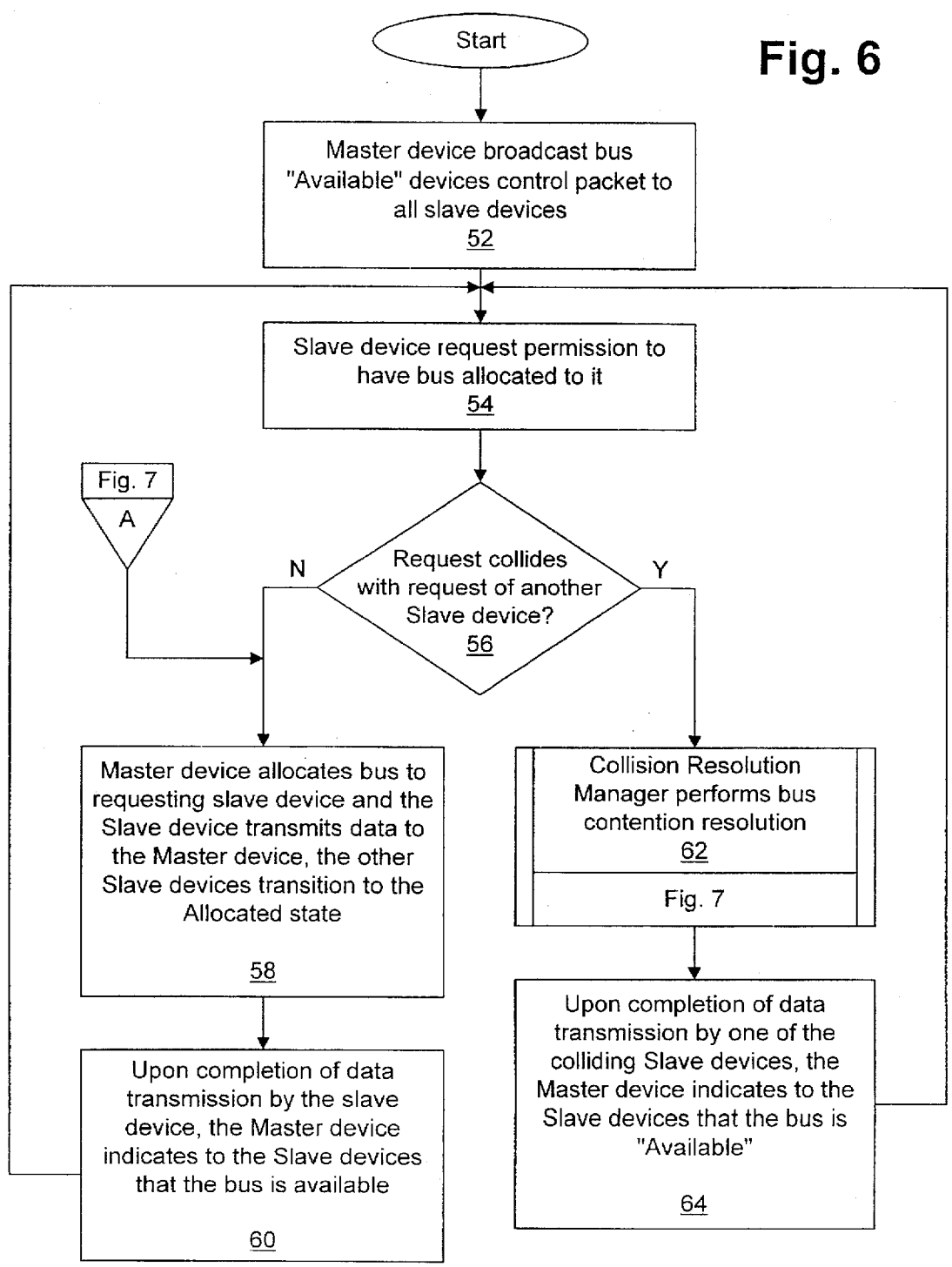
FIG. 6 is a flowchart of the operation of the datalink layer protocol of the present invention.

With reference now to FIG. 6, illustrated is the architecture and functionality for implementing a computer program comprising executable steps for causing the CSU\DSU devices to function in a particular manner as described below. During system initialization, the master device 2' and the slave devices 2 initialize to the Unknown state for a short period of time before the master device 2' eventually transitions into the bus Available state and communicates this state change to all the slave devices 2 by broadcasting a control packet over master transmit bus 36, as indicated by block 52. Note that the master device 2' transmits information to the slaves devices 2 via control packets over the master transmit bus 36 which only the master device can transmit on, and therefore, win not be subject of a contention problem. Further, a control packet, for purposes of the present invention, is a small datagram that conveys information between the master and slaves. At substantially that time, all slave devices 2 simultaneously transition to the Available state. The master device 2' and the slave devices 2 remain in the Available state until a slave device (or devices) has a datagram to transmit to the master device 2'. At this time, the slave device(s) 2 request permission to have the bus allocated to it by sending a bus request control packet to the master device 2', as indicated by block 54. At block 56, it is determined whether the slave device's bus request collides with another slave device's request. If no collision is detected by the master device 2', then block 56 transfers to block 58 where the master device 2' allocates the bus to the requesting slave device 2 by broadcasting an appropriate control packet. At this time, all slave devices 2, other than the one given control over the slave transmit bus 34, change state to the bus Allocated state. Now the slave device 2 controlling the slave transmit bus 36 transmits its datagram to the master device 2' with no possibility of a data collision occurring. When the slave device 2 completes its data transmission, the master device 2' notifies all slave devices 2 that the bus is now available by broadcasting an appropriate control packet, as indicated by block 60. Upon receipt of this control packet, all slaves devices 2 transition to the Available state whereby any slave device 2 having a datagram to transmit may request permission from the master device 2' to have the bus allocated to it, as indicated in block 54.

If, however, the master device 2' detected a bus collision at block 56, block 56 transfers to module 62 where the collision resolution manager 10 performs bus contention resolution. A significant feature of the present invention is that bus collisions are only possible on the slave transmit bus between multiple slave bus requests, as discussed hereinbefore. This is significant since the overall efficiency of the present invention is increased as the potential for data collisions are reduced. Since there is only one state in which collisions can occur, efficiency is maintained at a high level. Upon resolving the bus collision at module 62 whereby a colliding slave device 2 is allocated control over the slave transmit bus and allowed to completed its data transmission, module 62 transfers to block 64 where the master device 2' notifies all slaves devices 2 that the bus is now available by broadcasting an appropriate control packet. The master device 2' and the slave devices 2 again remain in the Available state until a slave device (or devices) have a datagram to transmit to the master, as indicated by block 54.

Once a bus collision has been detected, the collision resolution manager 10 attempts to resolve the collision as fast as possible by identifying one of the colliding slave of the collision detection mechanism 26 for the detection of data collisions on slave transmit bus 34.

Referring back to FIG. 7, upon detection of the bus collision, block 72 transfers to block 74 where the master device 2' notifies all slave devices 2 that a collision has occurred by transmitting a control packet over serial bus 36. In addition, at block 74, the master device 2' randomly identifies a re-try subset of slave devices 2 defined by either row 0 or row 1 of a Collision Resolution Matrix as provided below and denoted as Table 1.

TABLE 1

| | Collision Resolution Matrix | | | | | | | | | | | | | | |
|---|---|---|---|---|---|---|---|---|---|---|---|---|---|---|---|
| Device# | 1 | 2 | 3 | 4 | 5 | 6 | 7 | 8 | 9 | 10 | 11 | 12 | 13 | 14 | 15 | 16 |
| Row 0 | T | F | T | F | T | F | T | F | T | F | T | F | T | F | T | F |
| Row 1 | F | T | F | T | F | T | F | T | F | T | F | T | F | T | F | T |
| Row 2 | T | T | F | F | T | T | F | F | T | T | F | F | T | T | F | F |
| Row 3 | F | F | T | T | F | F | T | T | F | F | T | T | F | F | T | T |
| Row 4 | T | T | T | T | F | F | F | F | T | T | T | T | F | F | F | F |
| Row 5 | F | F | F | F | T | T | T | T | F | F | F | F | T | T | T | T |
| Row 6 | T | T | T | T | T | T | T | T | F | F | F | F | F | F | F | F |
| Row 7 | F | F | F | F | F | F | F | F | T | T | T | T | T | T | T | T | devices 2 so that its data can be transmit successfully. In general, the collision resolution manager 10 does this by selectively requesting various subsets of the slave devices 2 to retry their transmissions until a subset is selected that contains only one of the slave devices 2 that was part of the original collision. This process is discussed in more detail below with reference to FIGS. 7-8.

Figure 7:
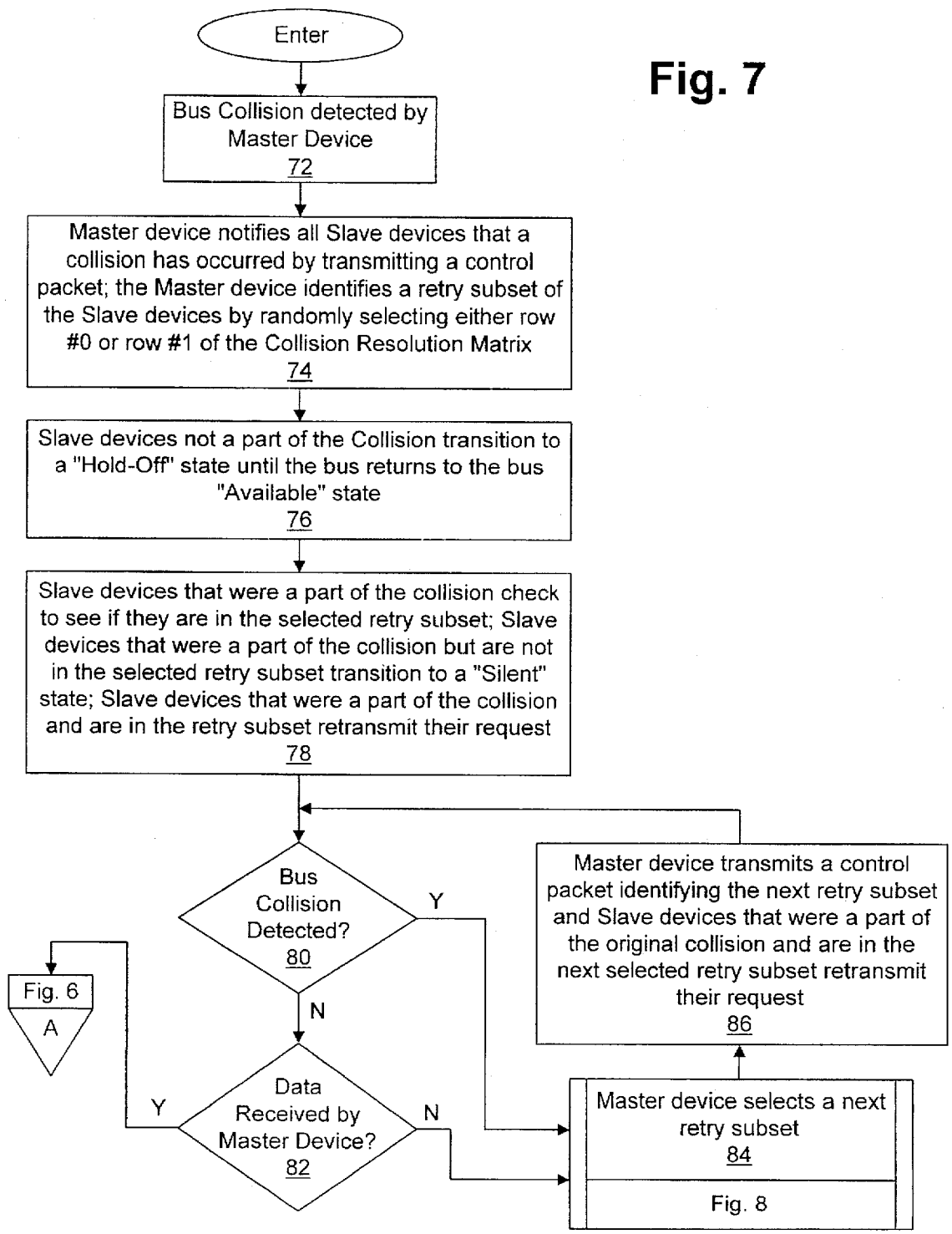
FIG. 7 is a flowchart of the operation of the collision resolution manager of FIG. 2.
Figure 8:
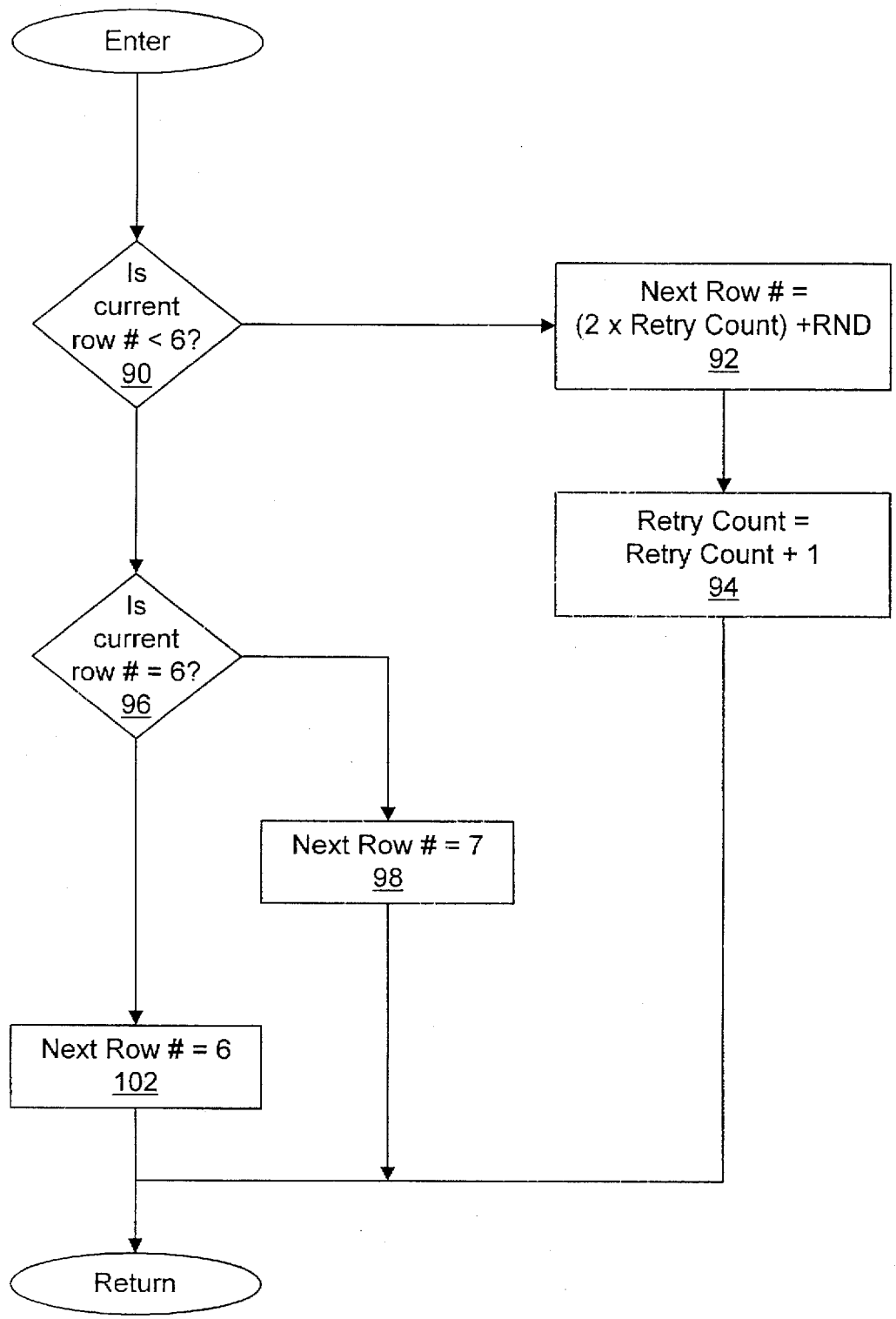
FIG. 8 is a flowchart of the operation of the row selection module of FIG. 7.

The following description is provided to illustrate the utility and functionality of the collision resolution manager 10 as implemented at module 62 in the preferred embodiment via the flowcharts illustrated in FIGS. 7 and 8. With particular reference to FIG. 7, after entry, block 72 indicates that the master device 2' has detected a bus collision on serial bus 34 as determined by block 56 in FIG. 6. Worth discussing at this point is the method by which the collision detection mechanism 26 (FIG. 2) of the master device detects a bus collision. As previously discussed, by the design of the interconnectivity between the master device 2' and the slave devices 2, the only time bus collision can occur in a steady-state nest carrier is when two or more slave devices 2 send a bus request to the master device 2' over serial bus 34, and those requests overlap in time. When this occurs, the bus collision detection mechanism 26 utilizes the serial communication channel (SCC) hardware associated with the processor 12 to indicate that bad communication signals have been received on the serial bus 34 as caused by timing differences in the control pulses on the serial bus 34. This is commonly referred to as SCC framing error indication. It is important to note that this is but one technique of collision detection that could be implemented as the part of the collision detection mechanism 26, and numerous other suitable techniques known to one skilled in the art could alternatively be implemented to perform the same functionality as described above. Further, as will be explained below, the collision detection mechanism 26 also looks for software validation by the state manager 28 (FIG. 2) which sends a control packet from the master device 2' to the slave devices, signaling that the last transmission was successful. Accordingly, only the master device 2' which receives the bus request from the slave devices requires implementation When the slave devices 2 receive the collision notification from the master device 2', the slave devices that are not a part of the original bus collision transition to the Hold/Off state and will not attempt to transmit until the bus returns to the Available state as indicated by block 76. In essence, these slave devices 2 are temporarily locked-out from transmitting over slave transmit bus 34 until the original bus collision has been resolved. Block 76 then transfers to block 78 where the slave devices 2 that were a part of the collision check to see if they are in the selected retry subset that can retransmit their bus requests. This is done by the collision resolution manager 10 of each slave device 2. If the slave devices 2 that were a part of the original collision are not in the selected retransmit subset, then they transition to a Silent state and will not attempt to transmit until the bus returns to the bus Available state. Those slave devices that were part of the original collision and are in the retry subset immediately retry their bus request over slave transmit bus 34. Next, block 78 transfers to block 80 where the master device 2' checks to see if there is another collision on slave transmit bus 34 which indicates that more than one of the slave devices in the original collision are in the selected retry subset. If a collision is detected by block 80, block 80 transfers to module 84. If no collision is detected, then block 80 transfers to block 82 which determines if the master device 2' received any data over slave transmit bus 34 following the request for retransmission. If no data was received within a predetermined period of time, this indicates that none of the colliding slave devices 2 were in the selected subset, and therefore, block 82 also transfers to block 84. In the preferred embodiment, where the slave transmit bus 34 is a 38.4 Kbps serial bus, it has been determined that a period of 30 milliseconds is suitable. If data was received by the master device 2', indicating only one of the colliding slave devices was in the selected retry subset, block 82 transfers to block 58 of FIG. 6 where the steps of block 58 through 64 are executed in the same manner as described hereinbefore so as to allow that slave device 2 to transmit its datagrams over slave transmit bus 34.

If a collision is detected at block 80, or if no data is detected at block 82, then module 84 selects a new retry subset of the Collision Resolution Matrix. The preferred steps of module 84 will be discussed below with reference to FIG. 8. Once module 84 has selected a next retry subset, block 84 transfers to block 86 where the master device 2' transmits a control packet over master transmit bus 36 identifying the next retry subset. The slave devices 2 that were a part of the original collision and that are in the next subset re-transmit their request to the master device 2' over slave transmit bus 34. Block 86 then transfers to block 80 where the steps of block 80, 82, 86 and module 84 are repeated until a single slave device 2 completes a successful transmission of its request over slave transmit bus 34. Note, by the engineering of the Collision Resolution Matrix, the number of times this subset reduction scheme described hereinbefore must be performed before a single slave device 2 successfully transmits is limited to a definite number that is dependent upon the number of slave devices 2 sharing the communication channel. This ability to provide deterministic resolution of a collision is especially desirable with low-bandwidth serial buses.

Thus, a significant feature of the present invention is the Collision Resolution Matrix. The Collision Resolution Matrix provides the resolution logic to the collision resolution manager 10 of the master and slave devices for identifying retry subsets so that the master device 2' and the slave devices 2 are in agreement as to what slave devices 2 will retransmit their requests following a collision. The Collision Resolution Matrix is known by the master device 2' and the slave devices 2 and essentially groups the slave devices 2 into retry subsets identified by respective row numbers, each subset including approximately one-half of the slave devices 2. Thus, in the preferred embodiment, the number of columns equals the number of devices 2 and the number of rows is equal to $\log_2$ (number of devices). Note, for simplicity, the Collision Resolution Matrix contains an even number of devices and includes the master device even though the master device doesn't need to be in the matrix. However, the master device is included because it can change to a slave device and vice-versa by user intervention. This change does not require a change to the Collision Resolution Matrix. Accordingly, in a worse-case scenario with the preferred embodiment, there will be at most four retries (assuming 16 devices) before a retry subset is selected that only contains one slave device that was a part of the original collision. In the Collision Resolution Matrix, the "T" means the slave device is in the retry subset, and a "F" means that the slave device is not in the retry subset and will not attempt to transmit again until the bus is returned to the Available state by the master device.

In order to support the operation of module 84 as described below, the state information associated with variables utilized in the operation of the collision resolution manager 10 is maintained by the master device 2'. The state information for each variable is re-initialized each time the bus transitions to the Available state. This is the state that the bus always returns to once another slave device 2 can attempt to transmit. When the bus is in any other state, all slave devices are prohibited from transmitting unless they are specifically requested to do so by the master device as described hereinbefore. The variables of the preferred embodiment includes Row # and Retry Count. When re-initialized upon the bus transitioning to the Available state, the state of Row # and Retry Count are set to zero.

With reference to FIG. 8, upon entry, block 90 determines if the current Row number is less than six (6). If it is, then block 90 transfers to block 92 where the next Row number is determined by multiplying the current Retry Count by the number two and adding the random variable RND. The random variable RND essentially generates in a random manner either a zero (0) or a one (1) when called. Thus, based upon the action of block 92, the first Row number will be either 1 or 2 because the Retry Count will be zero (0) upon initialization. Block 92 then transfers to block 94 where the Retry Count is incremented by one (1). Therefore, each subsequent Row number will be one (1) to three (3) greater than the previous Row number. For example, the Row number of the second retry subset will be either two (2) or three (3), the third time the Row number will be either four (4) or five (5), etc. However, if block 90 determines that the current Row number is not less than six (6), block 90 then transfers to block 96 where it is determined if the current Row number is equal to six (6). If it is, then block 96 transfers to block 98 which sets the next Row number to seven (7). If block 96 determines that the current Row number is not equal to six (6), then block 96 transfers to block 102 which sets the next Row number to six (6). Once the next Row number has been determined by one of blocks 92, 98, or 102, then module 84 transfers to block 86 of FIG. 7 where the aforementioned process repeated with the next Row number.

In order to more fully explain the present invention, FIGS. 9–12 are provided to illustrate several exemplary cases of bus collision resolution by the collision resolution manager 10. FIGS. 9–12 provide graphical illustrations of the communications between a particular slave device N and the master device during the occurrence of a bus collision where the slave device N is one of the colliding devices.

Figure 9:
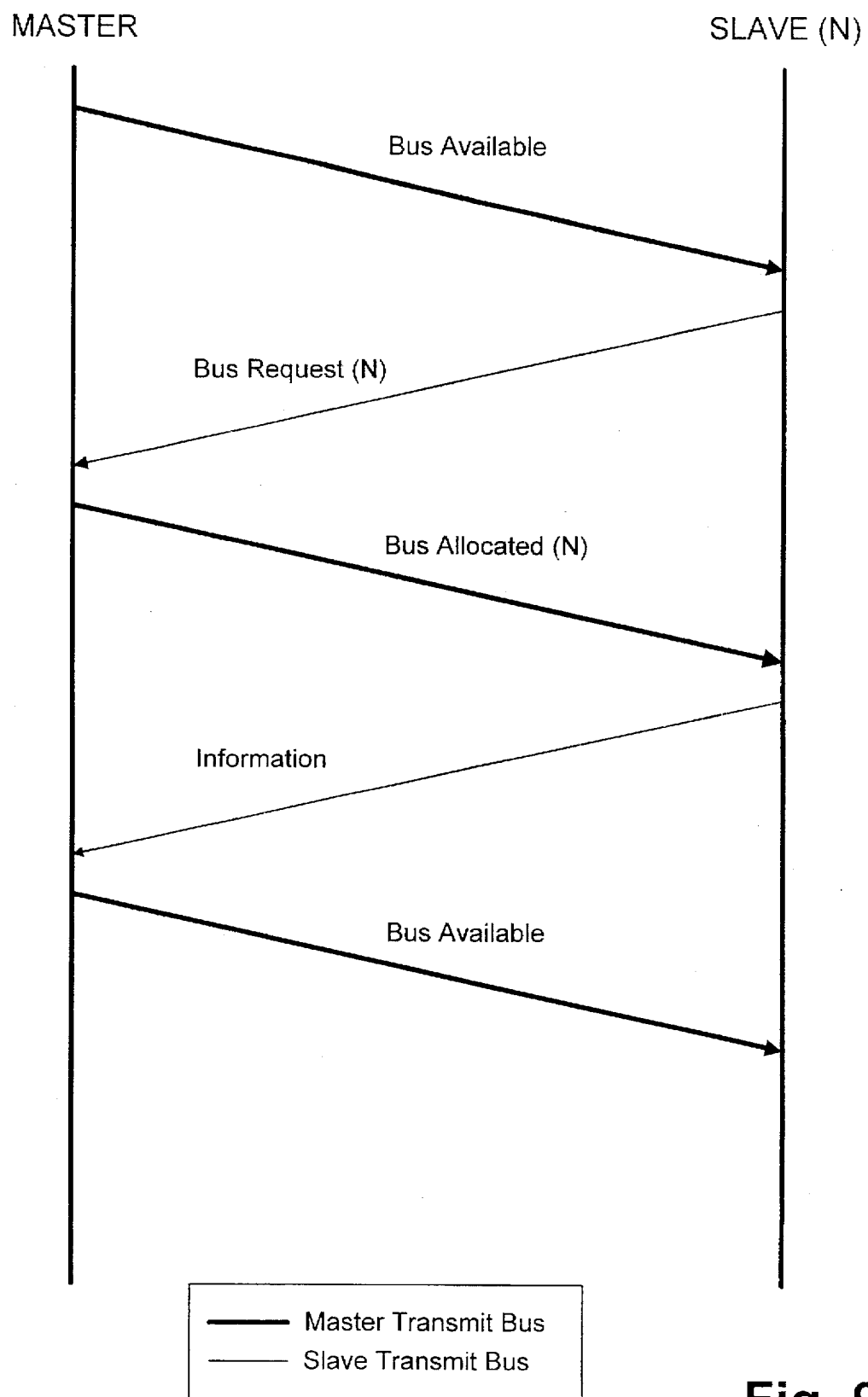
FIGS. 9 through 12 are graphical illustrations of the transmissions between a master device and a single slave device N in accordance with the operation of the collision resolution manager of the present invention when the slave device N desires to transmit a datagram over a serial bus shared with other slave devices.

FIG. 9 is an illustration of a slave device requesting the slave transmit bus with no collision occurring. Initially, the master device transmits a bus available control packet over master transmit bus 36. In response, slave device N sends a bus request to the master device requesting to transfer over serial bus 34. In the case illustrated in FIG. 9, slave device N is the only slave device responding with a bus request. Consequently, the master device transmits another control packet indicating that the bus is allocated to slave device N. The slave device N subsequently transmits its information (datagrams) over slave transmit bus 34. Upon the completion of slave device N's transmission, the master device issues a bus available control packet verifying that the transmission was successful.

Figure 10:
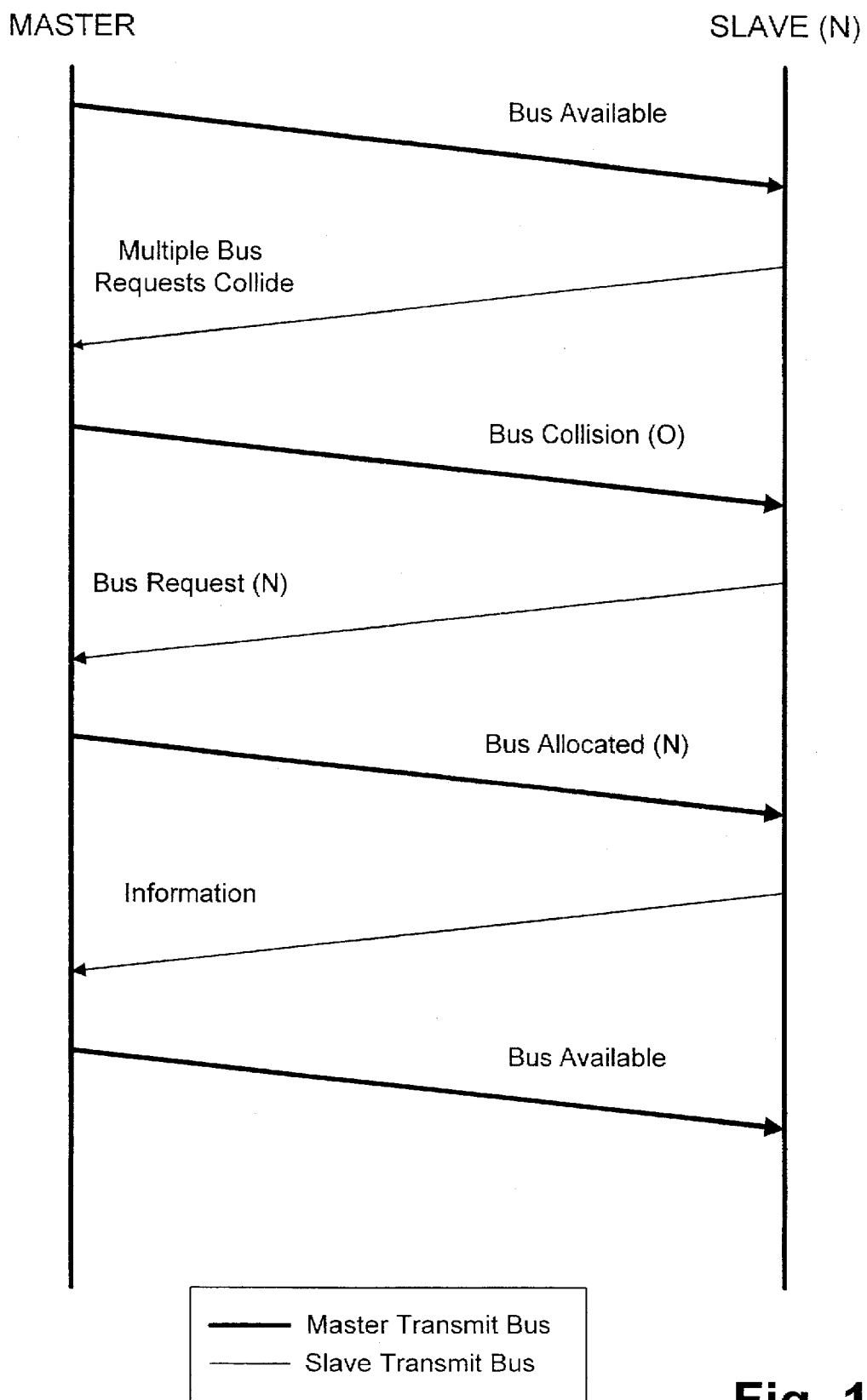

FIG. 10 illustrates a best-case scenario for bus collision resolution. Initially, the master device issues a bus available control packet over master transmit bus 36. In response, multiple slave devices attempt to request the bus at the same time and their requests collide. Upon detecting the collision, the master device issues a bus collision control packet identifying a retry subset value of zero (0) which specifies that the slave devices should access row zero (0) of the Collision Resolution Matrix to determine whether or not they are allowed to retry their bus request. In this case, the contention was resolved after one attempt because slave device N was the only slave device retrying its request. Consequently, the master device issues a bus allocated control packet granting control of the serial bus 34 to slave device N which subsequently transmits its information (datagram) over slave transmit bus 34. Again, upon slave device N completing its transmission, the master device issues a bus available control packet indicating the transmission was successful.

Figure 11:
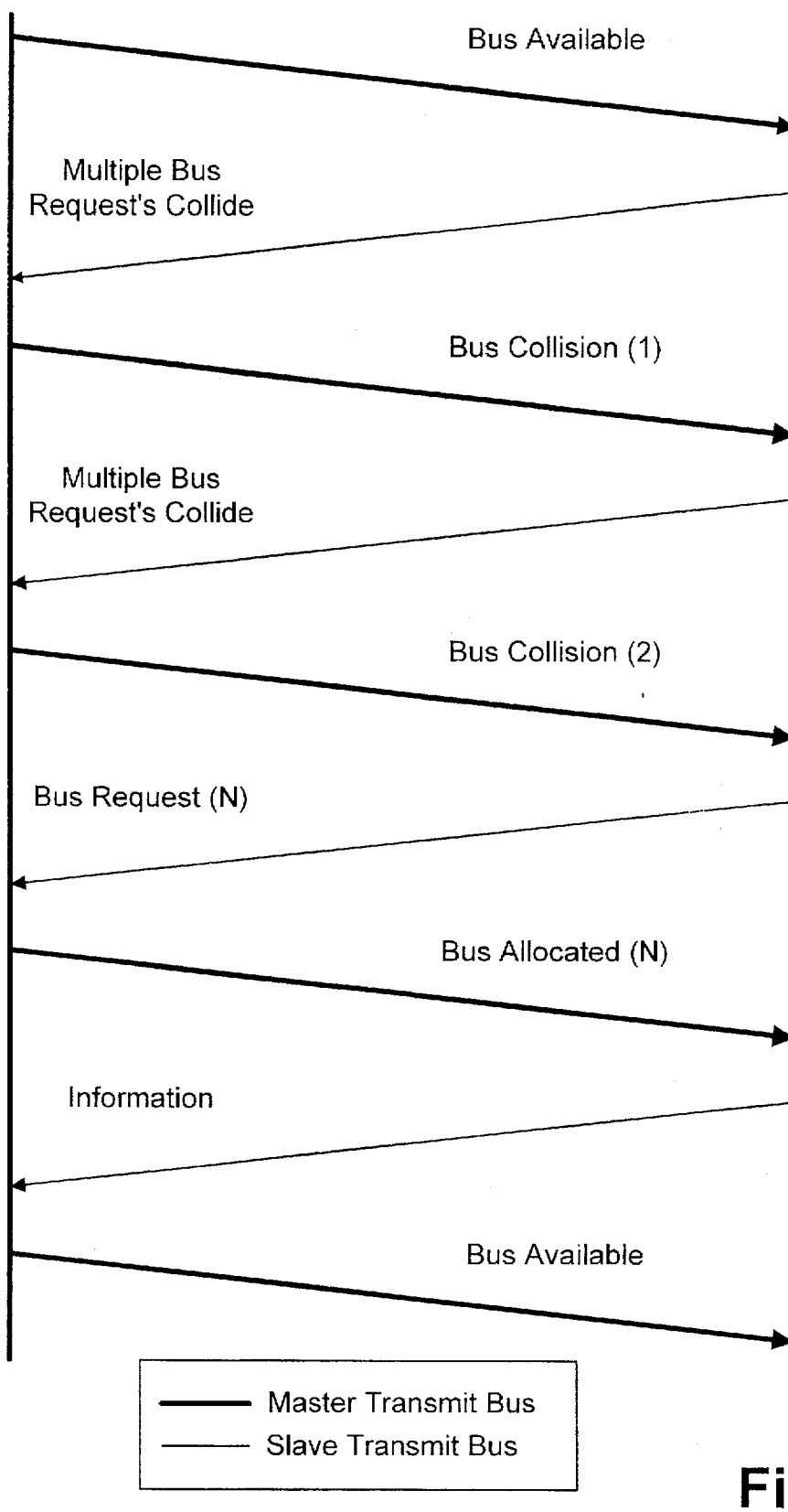

FIG. 11 illustrates a case requiring multiple retries before the bus collision is resolved. As with the previous examples, the master device begins by transmitting a bus available control packet which results in multiple slave devices attempting to request the bus at the same time, thereby resulting in a collision. Upon the detecting the collision, the master device issues a bus collision control packet identifying a subset value of one (1) which specifies that the slave devices that were a part of the collision should access row one (1) of the Collision Resolution Matrix to determine whether or not they are allowed to retry their bus request. As previously discussed, this initial row number will always be zero (0) or one (1). In this example, on the second attempt by the slave devices in the retry subset, some of the slave devices are still colliding. Therefore, the master device issued another bus collision packet specifying row two (2) of the Collision Resolution Matrix. In response, only one slave device, slave device N, responded with a bus request, thereby resolving the contention. The master device then grants control of slave transmit bus 34 to slave device N so that slave device N can transmit its information (datagrams) and, if the transmission was successful, the master device issued a bus available control packet, as described above.

Figure 12:
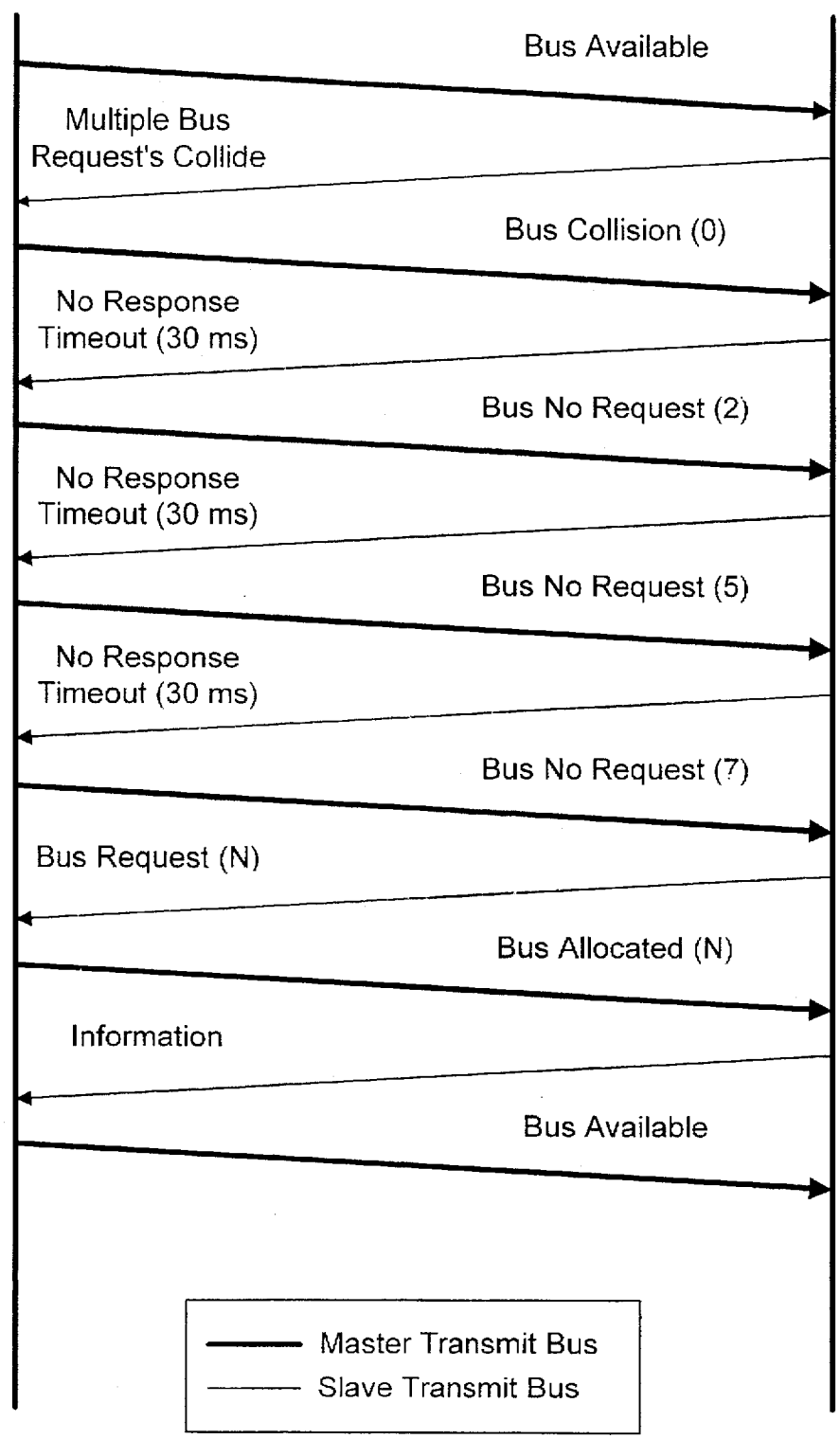

FIG. 12 provides a worst-case bus collision resolution. In the manner previously discussed, the master device, initially issues a bus available control packet which is responded to by multiple slave devices requesting the bus at the same time causing a bus collision. The master device then issues a bus collision control packet with a retry subset value of zero (0) which specifies that the slave devices that were a part of the collision should access rows zero (0) of the Collision Resolution Matrix to determine whether or not they are allowed to retry their bus transmissions. In this case, none of the buses in the original collision were in the subset designated by row zero (0) of the Collision Resolution Matrix. Accordingly, even though there was not a collision detected, no data was received over slave transmit bus 34 within the predetermined time-out period causing the master device to select a next retry subset and issues a no request control packet identifying a subset value of two (2) which specifies that the slaves should access row two (2) in order to determine whether or not they are allowed to retry their bus request. Note that the master device only sends a bus collision control packet when it actually detects a collision and a no request control packet in all other circumstances. Again, no data is received by the master bus within the predetermined time-out period indicating that none of the slave devices that were a part of the original collision are within the subset defined by row two (2) of the Collision Resolution Matrix. The master device issues two more bus no requests control packets before a single slave device responds Specifically, as shown in FIG. 12, in response to no request control packet designating the subset value of seven (7), slave device N is the only slave device to retry its bus request. Consequently, the master device issues a bus allocated control packet granting control of slave transmit bus 34 to slave device N in response to which slave device N transmits its information (datagrams) over serial bus 34. The master device subsequently issues an available control packet upon successful completion of slave device N's transmission.

In concluding the detailed description, it should be noted that it will be obvious to those skilled in the art that many variations and modifications can made to the preferred embodiment without substantially departing from the principles of the present invention. Also such variations and modifications are intended to be included herein within the scope of the present invention as set forth in the appended claims. Further, in the claims hereafter, the structures, materials, acts, and equivalents of all means or step-plus-function elements are intended to include any structure, materials or acts for performing their cited functions.

I claim:

1. A computer-based method for resolving a data collision on a serial bus shared by multiple devices, one of said devices being designated as a master device and all remaining said devices being designated as slave devices, said master device and said slave devices sharing a master transmit serial bus, said master device being responsible for allocating control over said serial bus to one said slave device at a time, and said data collision being due to a concurrent overlapping of data transmission of at least two of said slave devices, comprising the steps of:

detecting said data collision on said serial bus;
   selecting a retry subset of said slave devices;
   communicating said retry subset to each of said slave devices, and
   retransmitting respective data of said slave devices that were both involved in said data collision and are within said retry subset.

2. The method of claim 1, wherein said retry subset is selected by said master device.

3. The method of claim 1 further comprising the steps of:
   selecting a subsequent retry subset and retransmitting the respective data of said slave devices that were both involved in said data collision and are within said subsequent retry subset; and
   repeating said subsequent selection and retransmission until one said subsequent retry subset includes only one of said slave devices involved in said data collision.

4. A computer-based method for resolving a data collision on a serial bus shared by multiple devices due to concurrent overlapping data transmissions, comprising the steps of:

(a) designating one of said devices as a master device and all remaining said devices as slave devices, said master device being responsible for allocating control of said serial bus to one said slave device at a time;
   (b) detecting an original collision on said serial bus caused by multiple devices submitting bus requests to said master device for control of said serial bus and said requests colliding;
   (c) issuing a control signal to notifying said slave devices that said original collision occurred on said serial bus and issuing a control signal requesting retransmission of respective said bus requests from said slave devices designated in a retry subset of slave devices;
   (d) issuing a control signal transitioning said slave devices not a part of said original collision into a hold-off state;
   (e) retransmitting respective said bus requests of said slave devices that were a part of said original collision and are in said retry subset;
   (f) determining if a next collision occurs on said serial bus due to multiple retransmittal bus request colliding and, if so, then selecting a next said retry subset of said slave devices and issuing a next control signal requesting retransmission of respective said bus request from said slave devices designated in said next retry subset;
   (g) determining if no bus request are retransmitted in step (e) and if so, then selecting said next retry subset of said slave devices and issuing a next control signal requesting retransmission of respective said bus request from said slave devices designated in said next retry subset; and
   (h) determining if said retry subset included only one of said slave devices that were a part of said original collision, and if so, then allocating control of said serial bus to said one of said slave devices.

5. The method of claim 4, wherein said master device detects said original collisions, notifies said slave devices of said original collision, and issues said control signal to said slave devices.

6. The method of claim 5, wherein said master device communicates to said slave devices over a data-link between said master device and said slave devices.

7. The method of claim 4, wherein each said retry subset includes approximately one-half of said slave devices.

8. The method of claim 4, wherein step (g) comprises a timeout period of a predetermined period of time in which retransmitted said bus requests are looked for on said serial bus.

9. The method of claim 4, further including the step of:
   (i) retransmitting said bus request of said slave devices that were a part of said original collision and are in said next retry subset.

10. The method of claim 9, further including the step of:
    (j) repeating steps (f) through (i) until said one of said slave devices is allocated control over said serial bus in step (i).

11. The method of claim 4, wherein said retry subset is defined by a collision resolution matrix that defines a plurality of subsets of said slave devices, each subset designating approximately one-half of said slave devices for retransmission of respective bus requests.

12. The method of claim 4, wherein a worse-case resolution is logarithmically proportional to the number of said slave devices.

13. The method of claim 4, wherein said retry subset is randomly selected.

14. The method of claim 4, wherein the step of determining said next retry subset is performed so that a different said next retry subset is determined each iteration of step (f) and each iteration of step (g) in resolving said original collision.

15. The method of claim 4, wherein said master device and said slave devices include a collision resolution manager for implementing steps (a) through (h).

16. A collision resolution manager for resolving a data collision on a serial bus shared by multiple devices due to concurrent overlapping data transmission, one of said devices being designated as a master device and all remaining said devices being designated as slave devices, said mater device being responsible for allocating control over said serial bus to one said devices at a time, comprising:

means for notifying said slave devices once an original bus collision occurs on said serial bus due to multiple slave devices transmitting data over said serial bus at substantially the same time, and issuing a control signal allowing re-transmission of respective data from said slave devices specified in a retry subset of slave devices;

means for issuing a control signal transitioning said slave devices not a part of said original collision into a hold-off state and requesting said slave devices that were a part of said original collision and are in said retry subset to retransmit respective said data;

means for determining if a next collision occurs on said serial bus due to multiple retransmittal data colliding and, if so, then selecting a next retry subset of said slave devices and issuing a next control signal requesting retransmission of respective said data from slave devices designated in said next retry subset;

means for determining if no data are retransmitted in response to said request for retransmission of data; and if so, then selecting said next retry subset of said slave devices and issuing a next control signal requesting retransmission of respective said data from said slave devices designated in said next retry subset; and means for determining if said retry subset included only one of said slave devices that were a part of said original collision, and if so, then allocating control of said serial bus to one of said slave devices.

17. The collision resolution manager of claim 16, wherein said means for determining if no data is retransmitted includes a timeout period of a predetermined period of time that retransmitted data is looked for on said serial bus.

18. The collision resolution manager of claim 16, wherein no more than approximately $Log_2$ (number of slave devices) retry subsets need be selected in order to resolve said original collision.

19. The collision resolution manager of claim 16, wherein said retry subset is defined by a Collision Resolution Matrix defining a plurality of subsets of said slave devices, each subset designating approximately one-half of said slave devices for retry of respective bus request.

20. The collision resolution manager of claim 16, wherein said next retry subset is determined so that a different said next retry subset is determined following each said next collision.

21. A collision resolution manager for resolving a data collision on a serial bus shared by multiple devices, one of said devices being designated as master device and all remaining devices being designated as slave devices, said master device and said slave devices sharing a master transmit serial bus, said master device being responsible for allocating control over said serial bus to one of said slave devices at a time, and said data collision being due to a concurrent overlapping of data transmission of at least two of said slave devices comprising:

means for detecting said data collision on said serial bus;

means for selecting a retry subset of said slave devices;

means for communicating said retry subset to each of said slave devices; and means for retransmitting respective data of said slave devices that were both involved in said data collision and are within said retry subset.

22. A computer program product having a computer-readable medium having computer program logic recorded thereon for resolving a data collision on a serial bus shared by multiple devices, one of said devices being designated as master device and all remaining devices being designated as slave devices, said master device and said slave devices sharing a master transmit serial bus, said master device being responsible for allocating control over said serial bus to one of said slave devices at a time, and said data collision being due to a concurrent overlapping of data transmission of at least two of said slave devices comprising:

means for detecting said data collision on said serial bus;

means for selecting a retry subset of said slave devices;

means for communicating said retry subset to each of said slave devices; and means for retransmitting respective data of said slave devices that were both involved in said data collision and are within said retry subset.

23. A data collision resolution manager for resolving a data collision on a serial bus shared by multiple devices due to a concurrent data transmission by at least two of said devices, one of said devices being designated arbitrarily as a master device and all remaining said devices being designated as a slave device, comprising:

a collision detection mechanism located in said master device to detect a data transmission collision on said bus by at least two of said slave devices;

a predetermined hierarchy of retry subsets of said slave devices, said master device selecting a retry subset from said hierarchy for retransmission according to a predetermined order in response to said transmission collision;

a control signal transmitted from said master device to said slave devices causing the retransmission by formerly colliding slave devices that are within said selected retry subset;

a serial bus allocation mechanism located in said master device allocating said serial data bus for data transmission by a slave device that is the sole colliding slave device in said selected retry subset during retransmission.

24. The data collision manager of claim 23, further comprising a data transmission time-out within which said master device will detect data transmission after said control signal is transmitted.

25. The data collision manager of claim 23, wherein said hierarchy of retry subsets further comprises no more than approximately $Log_2$ (number of slave devices) retry subsets which must be selected to resolve said transmission collision.

26. The data collision manager of claim 25, wherein said hierarchy of retry subsets further comprises a collision resolution matrix defining a plurality of subsets of said slave devices, each subset designating approximately one-half of said slave devices for retry.

* * * * *